(No Model.)
T. FUHRMANN.
MEASURING TANK FOR OIL, &c.
No. 568,022. Patented Sept. 22, 1896.
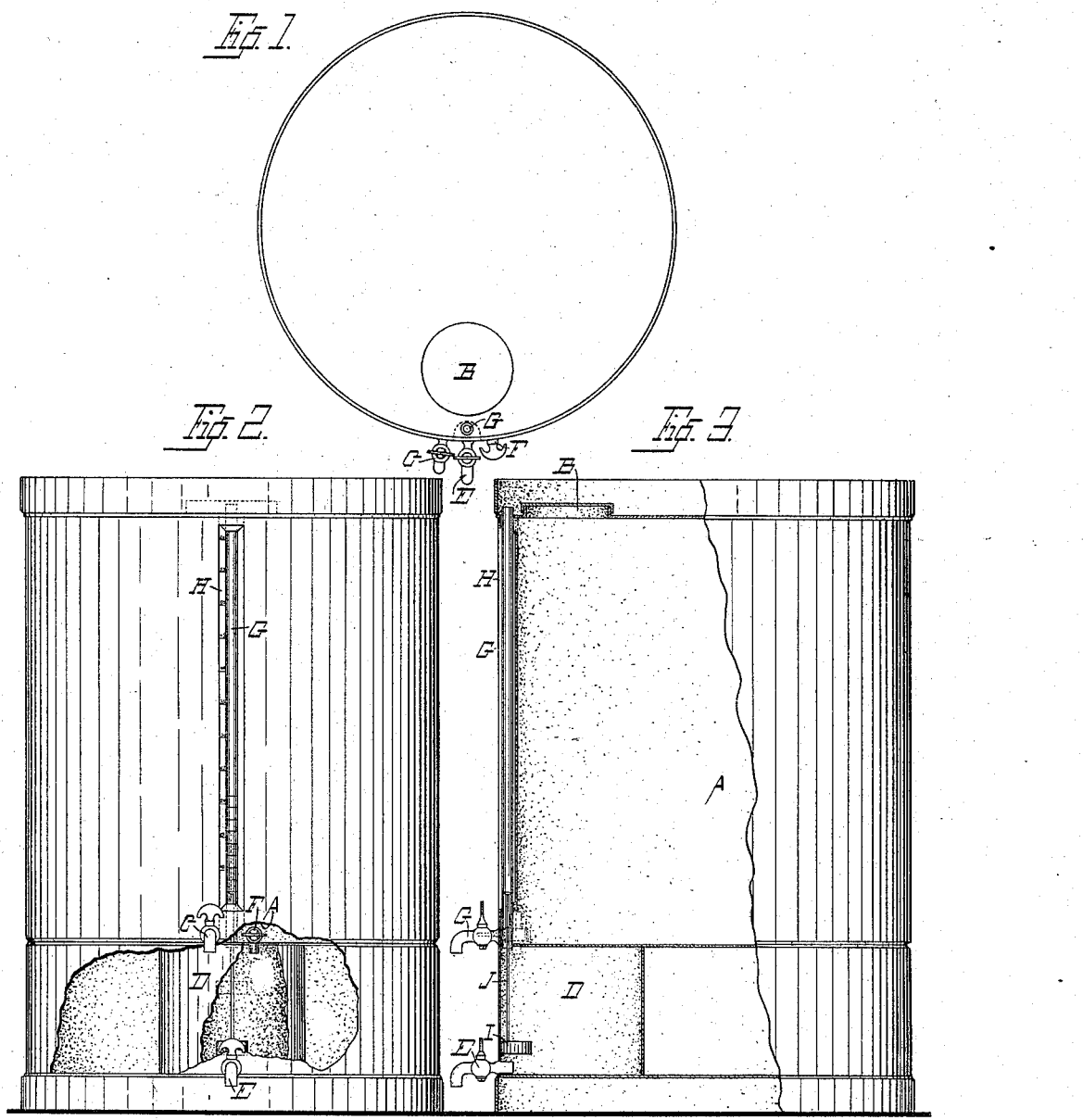

UNITED STATES PATENT OFFICE.

THEODORE FUHRMANN, OF MILWAUKEE, WISCONSIN.

MEASURING-TANK FOR OILS, &c.

SPECIFICATION forming part of Letters Patent No. 568,022, dated September 22, 1896.

Application filed March 16, 1896. Serial No. 583,307. (No model.)

*To all whom it may concern:*

Be it known that I, THEODORE FUHRMANN, a citizen of the United States, residing at Milwaukee, in the county of Milwaukee and State of Wisconsin, have invented new and useful Improvements in Measuring-Tanks for Oils and other Liquids, of which the following is a specification.

My invention relates to improvements in measuring-tanks for oils and other liquids.

I am aware that oil-tanks have heretofore been provided with separate measuring chambers and gages, and I do not claim the same, broadly, as my invention.

The object of my invention is to provide means whereby a single gage may be used for measuring the oil either in small quantities as drawn from a separate measuring-chamber or in large quantities as drawn from the main supply-chamber.

In the following description reference is had to the accompanying drawings, in which—

Figure 1 is a top view of my improved tank. Fig. 2 is a front view with a portion of the base-flange broken away to show the measuring-receiver. Fig. 3 is a side view, drawn partly in section, through the center of the indicating-glass.

Like parts are identified by the same reference-letters throughout the several views.

The main supply-chamber A is provided with an inlet-opening B and a faucet C, through which the oil may be withdrawn directly therefrom.

D is a measuring-chamber located beneath the supply-chamber A and provided with a faucet E. A valve F communicates from the upper to the lower chamber.

G is a vertically-disposed glass tube located in a channel H in the side of the supply-chamber and leading from the chamber D longitudinally through the channel and the top of the tank to the open air, the channel being formed to exclude all oil from the space surrounding said tube.

I is a float located in the measuring-chamber and provided with an indicating-stem J, projecting upwardly into said glass tube, so that the height of the stem in the tube will show the amount of oil in the measuring-chamber, the tube being spaced off and provided with marks or characters to indicate both the quantity remaining and the quantity withdrawn.

The channel H is spaced on one side and also provided with indicating-characters adapted to show the quantity of oil in the tank when the oil is admitted to the tube, as hereinafter explained.

In operation, where it is desired to measure small quantities for retail purposes and an exact measurement is required, the oil is admitted to the measuring-chamber through the valve F, which is closed as soon as this chamber is filled, as indicated by the float-stem in the tube G. The oil is then drawn off through the faucet E, the quantity withdrawn being indicated by the position of the float-stem; but when it is desired to refill the tank itself, or to withdraw oil in large quantities through the faucet C, the valve F is left open and the oil permitted to rise in the tube to the level of that in the tank. The rise or fall of the oil in the tank will then indicate the quantity of the oil inserted or withdrawn by its position in the tube with reference to the characters at the side of the channel H.

It will be observed that while I have for convenience described my invention as designed for measuring oil, it is equally well adapted to be used for any liquid.

Having thus described my invention, what I claim as new, and desire to secure by Letters Patent, is—

A measuring-tank for oils and other liquids, consisting in the combination of a main supply-chamber provided with a discharge-faucet and an inlet-opening, a measuring-chamber located below the supply-chamber and connected therewith by a suitable valve, a gage-tube communicating from the measuring-chamber to the exterior above the supply-chamber, a float located in said measuring-chamber and provided with a stem projecting into said gage-tube, a series of indicating-characters being marked on said gage-tube and adapted to indicate the quantity of liquid drawn from said measuring-chamber with reference to the movement of said float-stem, and an additional set of indicating-characters being located at the side of said tube and adapted to indicate the quantity of liquid drawn from or inserted in said supply-chamber with reference to the height of the oil in said gage-tube, substantially as described.

In testimony whereof I affix my signature in the presence of two witnesses.

THEODORE FUHRMANN.

Witnesses:
LYMAN G. WHEELER,
LEVERETT C. WHEELER.